United States Patent
Niizuma (10) Patent No.: US 10,018,516 B2
(45) Date of Patent: Jul. 10, 2018

(54) FOREIGN MATTER DETECTION DEVICE

(71) Applicant: IHI Corporation, Tokyo (JP)

(72) Inventor: Motonao Niizuma, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 14/735,198

(22) Filed: Jun. 10, 2015

(65) Prior Publication Data

US 2015/0308905 A1    Oct. 29, 2015

Related U.S. Application Data

(63) Continuation of application No. PCT/JP2013/078965, filed on Oct. 25, 2013.

(30) Foreign Application Priority Data

Jan. 8, 2013  (JP) .................................. 2013-001070

(51) Int. Cl.
*G01K 11/32* (2006.01)
*H02J 50/60* (2016.01)
(Continued)

(52) U.S. Cl.
CPC ............ *G01K 11/32* (2013.01); *B60L 11/182* (2013.01); *B60L 11/1833* (2013.01);
(Continued)

(58) Field of Classification Search
CPC .......... G01K 11/32; G08G 1/042; G01V 8/16; G01M 11/33; H02J 7/025; H02J 5/005; H02J 7/027; B60L 11/182; B60L 11/1833; B60L 2270/147; B60L 2250/16; B60L 2210/40; B60L 2210/30; B60L 2250/10; B60L 2240/36; Y02T 10/7241; Y02T 10/7005; Y02T 90/127; Y02T 10/7072;
(Continued)

(56) References Cited

U.S. PATENT DOCUMENTS

| | | | | |
|---|---|---|---|---|
| 4,362,780 A | * | 12/1982 | Marzocchi | E01C 3/006 404/17 |
| 5,028,146 A | * | 7/1991 | Wada | G01K 11/32 374/129 |

(Continued)

FOREIGN PATENT DOCUMENTS

| | | | | |
|---|---|---|---|---|
| JP | 02-195218 A | | 8/1990 | |
| JP | 2006168458 A | * | 6/2006 | .............. B60M 1/28 |

(Continued)

OTHER PUBLICATIONS http://www.thesaurus.com/misspelling?term=flexurale&s=t.*
(Continued)

*Primary Examiner* — Mohamed K Amara
(74) *Attorney, Agent, or Firm* — Volpe and Koenig, P.C.

(57) ABSTRACT

A foreign matter detection device of the present invention is provided with a temperature detection means that detects a temperature distribution in a magnetic field that is formed by a power-supplying device that transmits power wirelessly to a power-receiving device; and a signal processor that, based on a detection result from the temperature detection means, detects a conductive foreign matter in the magnetic field.

4 Claims, 5 Drawing Sheets

(51) Int. Cl.
| | |
|---|---|
| H02J 50/12 | (2016.01) |
| B60L 11/18 | (2006.01) |
| H02J 5/00 | (2016.01) |
| H02J 7/02 | (2016.01) |
| G01M 11/00 | (2006.01) |
| G01V 8/16 | (2006.01) |
| G08G 1/042 | (2006.01) |

(52) U.S. Cl.
CPC .............. *G01M 11/33* (2013.01); *G01V 8/16* (2013.01); *G08G 1/042* (2013.01); *H02J 5/005* (2013.01); *H02J 7/025* (2013.01); *H02J 7/027* (2013.01); *H02J 50/12* (2016.02); *H02J 50/60* (2016.02); *B60L 2210/30* (2013.01); *B60L 2210/40* (2013.01); *B60L 2240/36* (2013.01); *B60L 2250/10* (2013.01); *B60L 2250/16* (2013.01); *B60L 2270/147* (2013.01); *Y02T 10/7005* (2013.01); *Y02T 10/7072* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(58) Field of Classification Search
CPC ....... Y02T 90/12; Y02T 90/122; Y02T 90/14; Y02T 90/125; Y02T 90/121
See application file for complete search history.

(56) References Cited

U.S. PATENT DOCUMENTS

| | | | | |
|---|---|---|---|---|
| 5,095,514 | A * | 3/1992 | Curtis | G01D 5/35377 385/12 |
| 5,356,220 | A * | 10/1994 | Iida | C21B 7/24 374/124 |
| 5,825,804 | A * | 10/1998 | Sai | G01K 11/32 250/227.18 |
| 6,079,875 | A * | 6/2000 | Klass | G01K 11/32 374/130 |
| 8,075,181 | B1 * | 12/2011 | Stauffer | A61B 5/015 374/121 |
| 8,800,738 | B2 * | 8/2014 | Urano | H02J 7/025 191/10 |
| 9,124,126 | B2 * | 9/2015 | Ichikawa | B60L 11/182 |
| 9,512,711 | B2 * | 12/2016 | Sobolewski | E21B 47/01 |
| 9,641,027 | B2 * | 5/2017 | Tsuji | H02J 50/12 |
| 9,651,474 | B2 * | 5/2017 | Farhadiroushan | G01K 1/14 |
| 2008/0164840 | A1 * | 7/2008 | Kato | H01F 27/2804 320/108 |
| 2009/0278651 | A1 | 11/2009 | Okada et al. | |
| 2011/0254377 | A1 * | 10/2011 | Wildmer | B60L 11/182 307/104 |
| 2012/0119914 | A1 * | 5/2012 | Uchida | H02J 5/005 340/584 |
| 2012/0200151 | A1 * | 8/2012 | Obayashi | B60L 11/123 307/9.1 |
| 2013/0009650 | A1 * | 1/2013 | Sakakibara | B60L 3/00 324/546 |
| 2013/0015720 | A1 * | 1/2013 | Shimokawa | H02J 5/005 307/104 |
| 2013/0028555 | A1 * | 1/2013 | Dailey | B32B 7/02 385/12 |
| 2013/0038135 | A1 * | 2/2013 | Ichikawa | B60L 11/182 307/104 |
| 2014/0225563 | A1 * | 8/2014 | Ichikawa | B60L 11/182 320/108 |
| 2014/0232331 | A1 * | 8/2014 | Stamenic | B60L 11/182 320/108 |
| 2014/0302782 | A1 * | 10/2014 | Raab | H04B 5/0037 455/41.1 |
| 2015/0213950 | A1 * | 7/2015 | Yuasa | H01F 38/14 307/104 |
| 2015/0270717 | A1 * | 9/2015 | Fujimaki | H02J 5/005 307/10.1 |
| 2015/0288196 | A1 * | 10/2015 | Park | H02J 5/005 307/104 |
| 2015/0357828 | A1 * | 12/2015 | Ichikawa | H01F 38/14 307/104 |
| 2015/0362614 | A1 * | 12/2015 | Obayashi | G01V 3/104 324/207.17 |
| 2015/0380154 | A1 * | 12/2015 | Kagami | H01F 27/2823 336/220 |
| 2016/0064952 | A1 * | 3/2016 | Matsumoto | H01F 38/14 307/104 |
| 2016/0079767 | A1 * | 3/2016 | Hatanaka | H02J 5/005 307/104 |
| 2016/0082847 | A1 * | 3/2016 | Asai | B60L 11/182 307/10.1 |
| 2016/0114687 | A1 * | 4/2016 | Ichikawa | B60L 5/005 701/22 |
| 2016/0126746 | A1 * | 5/2016 | Keeling | H02J 5/005 307/104 |
| 2016/0197492 | A1 * | 7/2016 | Fujita | H01F 38/14 307/104 |
| 2016/0336814 | A1 * | 11/2016 | Miyamoto | G01N 27/00 |
| 2017/0043668 | A1 * | 2/2017 | Chiyo | H02J 17/00 |
| 2017/0043672 | A1 * | 2/2017 | Araki | H02J 7/00 |
| 2017/0097437 | A1 * | 4/2017 | Widmer | G01V 3/10 |
| 2017/0103850 | A1 * | 4/2017 | Furiya | H01F 38/14 |

FOREIGN PATENT DOCUMENTS

| | | | | |
|---|---|---|---|---|
| JP | 2010073885 A | * | 4/2010 | ............ B60L 11/18 |
| JP | 2010-226946 A | | 10/2010 | |
| JP | 2012-055109 A | | 3/2012 | |
| JP | 2012-089618 A | | 5/2012 | |
| JP | 2012-257404 A | | 12/2012 | |
| KR | 20120119914 A | * | 10/2012 | ......... H04L 12/6418 |
| KR | 20130015720 A | * | 2/2013 | ......... H05B 33/0818 |
| WO | 2009/040998 A1 | | 4/2009 | |
| WO | 2012/176569 A1 | | 12/2012 | |
| WO | 2013/001810 A1 | | 1/2013 | |

OTHER PUBLICATIONS

Espacenet English Translations of JP 2012055109 and JP JP 2012-089618.*
International Search Report, PCT/JP2013/078965, Nov. 26, 2013, 2 pgs.

* cited by examiner

FOREIGN MATTER DETECTION DEVICE

This application is a continuation application based on a PCT Patent Application No. PCT/JP2013/078965, filed on Oct. 25, 2013, whose priority is claimed on Japanese Patent Application No. 2013-001070, filed on Jan. 8, 2013. The contents of both the PCT application and the Japanese Patent Application are incorporated herein by reference.

TECHNICAL FIELD

The present invention relates to a foreign matter detection device.

BACKGROUND ART

In recent years, wireless power supply systems that supply power wirelessly to a battery mounted in a moving body such as a vehicle have been proposed. The wireless power supply systems are provided, for example, with a power-receiving coil mounted in the moving body and a power-supplying coil installed on the power supply side, and transmit electric power using a magnetic field that is formed by the power-supplying coil.

In the wireless power supply systems, it is known that if a foreign matter that is formed wholly or partly from an electrically conductive material such as metal or conductive plastic (i.e., a conductive foreign matter) intrudes between the power-receiving coil and the power-supplying coil, then a loss in energy occurs due to the heat generated by the conductive foreign matter, and there is a decrease in the transmission efficiency. To deal with this problem, for example, as is shown in Patent document 1, it has been proposed that countermeasures be devised that prevent a foreign matter from intruding between the power-receiving coil and the power-supplying coil.

DOCUMENTS OF RELATED ART

Patent Documents

[Patent document 1] Japanese Unexamined Patent Application (JP-A) No. 2010-226946

SUMMARY OF THE INVENTION

Technical Problem

However, when a moving body such as a vehicle or the like is not present, it often happens that the power-supplying coil (or a cover covering the power-supplying coil) is left outside in an exposed state. Even if countermeasures such as those described above are devised, in some cases, it may be difficult to completely prevent the intrusion of a conductive foreign matter. As a consequence, to deal with an energy loss caused by the intrusion of a conductive foreign matter, there is a need to also consider how to devise countermeasures to limit the effects thereof to a minimum.

The present invention is conceived in view of the above-described problem and it is an object thereof to make it possible to quickly detect any reduction in transmission efficiency in a wireless power supply system that is caused by a conductive foreign matter.

Solution to the Problem

In order to solve the above-described problem, the present invention employs the following structure.

A first aspect of the present invention is a foreign matter detection device that includes: a temperature detection means that detects a temperature distribution in a magnetic field formed by a power-supplying device transmitting power wirelessly to a power-receiving device; and a signal processor that, based on a detection result from the temperature detection means, detects a conductive foreign matter in the magnetic field.

A second aspect of the present invention is the above-described first aspect, wherein the temperature detection means is provided with: an optical waveguide laid in the magnetic field; a light source unit that outputs detection light into the optical waveguide; and a light-receiving unit that receives the detection light through the optical waveguide.

A third aspect of the present invention is the above-described second aspect, wherein the optical waveguide is an optical fiber.

A fourth aspect of the present invention is the above-described third aspect, further including a supporting portion, wherein the power-supplying device is provided with a power-supplying coil and the power-supplying coil is provided in a parking space for a vehicle, and the supporting portion is located above the power-supplying coil, is formed from an insulating material and supports the optical fiber.

A fifth aspect of the present invention is the above-described fourth aspect, wherein the supporting portion is a sheet material that is formed from glass fibers and to whose bottom surface the optical fiber adheres.

A sixth aspect of the present invention is the above-described fifth aspect, wherein the light source unit and the light-receiving unit are located below a vehicle supporting surface of the parking space, and the supporting portion is positioned such that a top surface of the supporting portion is flush with the vehicle supporting surface.

A seventh aspect of the present invention is the above-described fourth aspect, wherein the supporting portion is formed from a plurality of flexible wire components.

An eighth aspect of the present invention is any of the above-described fourth through seventh aspects, wherein the optical fiber is laid such that, when viewed from above, the optical fiber has no overlapping portions.

A ninth aspect of the present invention is any of the above-described fourth through eighth aspects, wherein a plurality of the optical fibers are laid.

Effects of the Invention

A foreign matter detection device of the present invention is provided with a temperature detection means that detects the temperature distribution in a magnetic field formed by a power-supplying device. When a conductive foreign matter intrudes into the magnetic field, the conductive foreign matter generates heat due to the effects of the magnetic field. Thus a signal that shows the intrusion of the conductive foreign matter is contained in the detection result from the temperature detection device. Accordingly, by analyzing the detection result from the temperature detection device using a signal processor, it is possible to detect the presence of the conductive foreign matter. As a result, according to the present invention, when there is an intrusion of a conductive foreign matter, it is possible to quickly detect any reduction in transmission efficiency in a wireless power supply system that is caused by the conductive foreign matter.

DESCRIPTION OF THE EMBODIMENTS

Hereinafter, an embodiment of a foreign matter detection device according to the present invention will be described with reference to the drawings. Note that, in the following drawings, the scale of each component has been modified in order to make each component appear in a recognizable size.

First Embodiment

Figure 1:
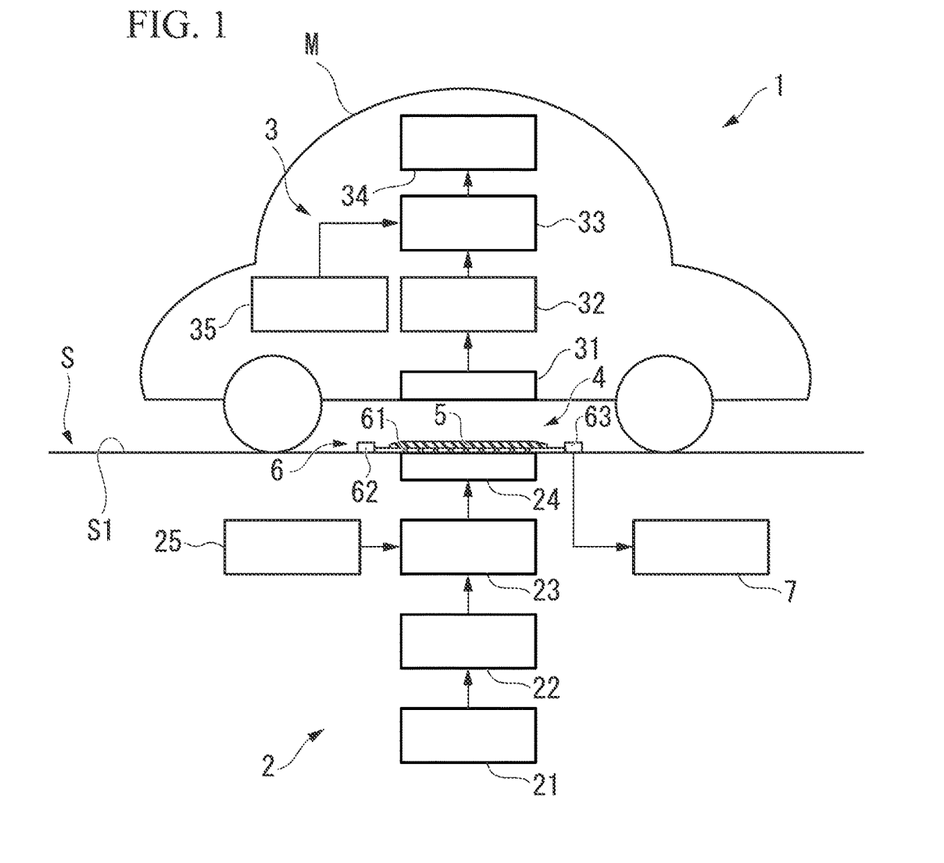
FIG. 1 is a view showing the schematic structure of a wireless power supply system that incorporates a foreign matter detection device according to a first embodiment of the present invention.

FIG. 1 is a view showing the schematic structure of a wireless power supply system 1 that incorporates a foreign matter detection device 4 of the present embodiment. As is shown in the drawing, the wireless power supply system 1 includes a power-supplying device 2, a power-receiving device 3, and the foreign matter detection device 4.

The power-supplying device 2 is provided with a power source 21, a rectifier circuit 22, a power-supplying circuit 23, a power-supplying coil 24, and a power supply control unit 25.

Output terminals of the power source 21 are connected to input terminals of the rectifier circuit 22. The power source 21 is an AC power supply that supplies AC power, that is needed for the power supply to the power-receiving device 3, to the rectifier circuit 22. The power source 21 is a system power supply that supplies, for example, 200V or 400V three-phase AC power, or 100V single-phase AC power. Input terminals of the rectifier circuit 22 are connected to the power source 21, while output terminals thereof are connected to the power-supplying circuit 23. The rectifier circuit 22 rectifies the AC power supplied from the power source 21 into DC power which it then outputs from its output terminals.

Input terminals of the power-supplying circuit 23 are connected to the rectifier circuit 22, while output terminals thereof are connected to both ends of the power-supplying coil 24. The power-supplying circuit 23 is a type of inverter that is provided with the power-supplying coil 24 and with a resonance capacitor that forms part of a power supply-side resonance circuit. The power-supplying circuit 23 converts the frequency of DC power supplied from the rectifier circuit 22 into AC power having a higher frequency than the AC power of the power source 21 (i.e., into high-frequency power) based on control commands input from the power supply control unit 25.

The power-supplying coil 24 is a helical coil having a predetermined coil diameter. The power-supplying coil 24 is installed in a parking space S for a vehicle M (see FIG. 1) with the coil axis thereof aligned in an up-down direction (i.e., in a vertical direction), and either exposed on the ground surface or molded in an electrically insulating material such as plastic or the like. Note that, in the present embodiment, the power-supplying coil 24 is embedded in the ground (or in a mechanical-parking pallet) such that a top surface 24a of the power-supplying coil 24 is flush with a vehicle-supporting surface S1 of the parking space S (see FIG. 2A). Moreover, in the present embodiment, the wires of the power-supplying coil 24 are wound in a circular shape when viewed from above, and the outer peripheral shape of the power-supplying coil 24 is circular (see FIG. 2B).

The power supply-side resonance circuit that is provided with the above-described power-supplying coil 24 generates a magnetic field when it is supplied with high-frequency electric power. A power reception-side resonance circuit (described below) is made to resonate with the magnetic field, and power is transmitted wirelessly from the power-supplying coil 24 to a power-receiving coil 31 (described below).

The power supply control unit 25 is provided with a microprocessor and memory and the like, and is a software-type control device that functions based on a predetermined power supply program. The power supply control unit 25 is connected to the power-supplying circuit 23, and controls the power-supplying circuit 23 based on the power supply program.

The power-receiving device 3 is mounted in the vehicle M, and is provided with the power-receiving coil 31, a power-receiving circuit 32, a charging circuit 33, a battery 34, and a power reception control unit 35. Note that the vehicle M referred to here is an automobile that travels using electricity as a power source such as, for example, an electric vehicle or a hybrid vehicle, however, the present invention is also applicable to all devices in general that have a function of traveling using electricity as a power source such as automated guided vehicles.

The power-receiving coil 31 is a helical coil having a coil diameter that is substantially the same as that of the power-supplying coil 24 of the power-supplying device 2, and is provided in a bottom portion of the vehicle M with the coil axis thereof extending in an up-down direction (i.e., in a vertical direction) such that it is able to face the power-supplying coil 24. Both ends of the power-receiving coil 31 are connected to the power-receiving circuit 32.

The power-receiving circuit 32 is connected to both ends of the power-receiving coil 31, and output terminals thereof are connected to input terminals of the charging circuit 33. The power-receiving circuit 32 is a type of rectifier circuit that is provided with the power-receiving coil 31, and with a resonance capacitor that forms part of a power reception-side resonance circuit. The power-receiving circuit 32 converts AC power that has been transmitted to the power reception-side resonance circuit into DC power, and then supplies it to the charging circuit 33. Note that the electrostatic capacity of the resonance capacitor of the power-receiving circuit 32 is set such that the resonance frequency of the power supply-side resonance circuit is the same as the resonance frequency of the power reception-side resonance circuit.

The input terminals of the charging circuit 33 are connected to the output terminals of the power-receiving circuit 32, and the output terminals of the charging circuit 33 are connected to input terminals of the battery 34. Power (i.e., DC power) supplied from the power-receiving circuit 32 charges the battery 34. The battery 34 is a rechargeable battery (for example, a secondary battery such as a lithium ion battery or a nickel hydrogen battery), and supplies drive power to a travel motor or the like (not shown) that is mounted in the vehicle M.

The power reception control unit 35 is provided with a microprocessor and memory and the like, and is a software-type control device that functions based on a predetermined power reception control program. The power reception control unit 35 is connected to the charging circuit 33, and controls the charging circuit 33 based on the power reception control program.

Figure 2A:
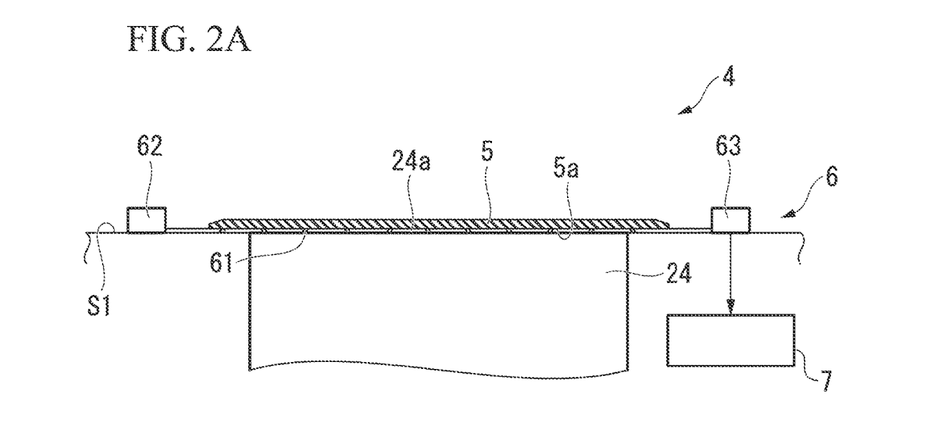
FIG. 2A is an enlarged side view that includes the foreign matter detection device according to the first embodiment of the present invention.
Figure 2B:
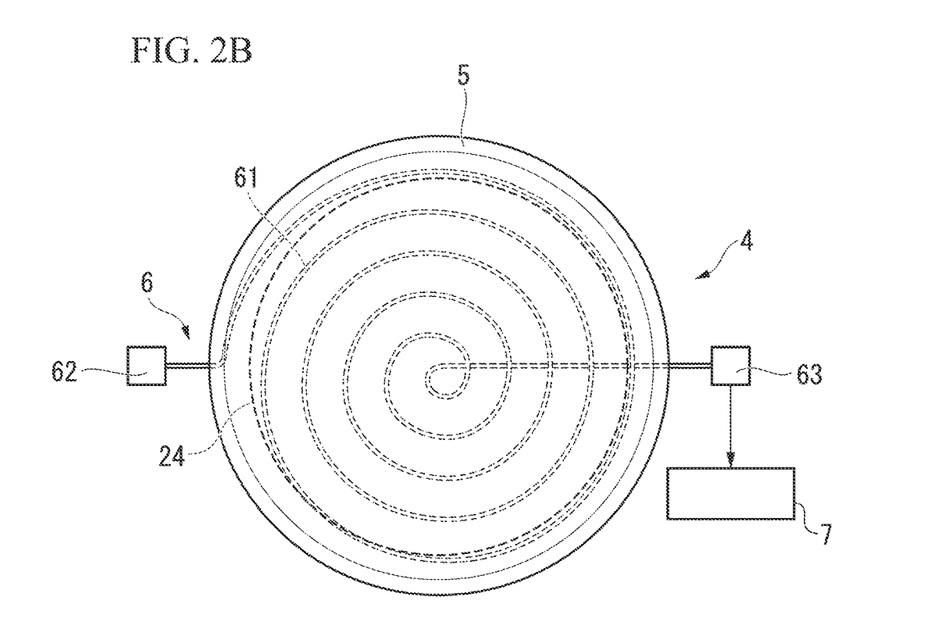
FIG. 2B is an enlarged top view that includes the foreign matter detection device according to the first embodiment of the present invention.

FIGS. 2A and 2B are enlarged views that include the foreign matter detection device 4. FIG. 2A is a side view, while FIG. 2B is a top view. As is shown in these drawings, the foreign matter detection device 4 is provided with a glass sheet 5 (i.e., a supporting portion), a temperature detection unit 6 (i.e., a temperature detection means or a temperature detector), and a signal processing unit 7 (i.e., a signal processing means or a signal processor).

The glass sheet 5 is a sheet component that is formed from glass fibers, which are electrically insulating, and is provided on the vehicle-supporting surface S1 of the parking space S so as to cover the power-supplying coil 24 from above. An optical fiber 61 (described below) adheres to a bottom surface 5a of the glass sheet 5 such that the glass sheet 5 supports the optical fiber 61. Namely, the foreign matter detection device 4 of the present embodiment is provided with the glass sheet 5 as a supporting portion that is formed from an insulating material that supports the optical fiber 61, and is placed on top of the power-supplying coil 24.

The temperature detection unit 6 is an optical fiber sensor that is formed from the optical fiber 61 (i.e., an optical waveguide), a light source unit 62, and a light-receiving unit 63. An input terminal of the optical fiber 61 is connected to the light source unit 62, while an output terminal thereof is connected to the light-receiving unit 63. As is shown in FIG. 2B, a portion between the input terminal and the output terminal is wound in a spiral configuration as it is laid out. Because the optical fiber 61 adheres to the bottom surface of the glass sheet 5, it is placed between the power-supplying coil 24 and the power-receiving coil 31 (namely, in a magnetic field formed from the power-supplying coil 24). Note that the optical fiber 61 is wound in a substantially circular shape such that, when viewed from above, the portion that is wound in a spiral shape is large enough to cover the entirety of the power-supplying coil 24. In this way, by making the shape of the wound portion of the optical fiber 61 the same shape as the power-supplying coil 24, when viewed from above, the optical fiber 61 can uniformly cover the power-supplying coil 24 without any portions thereof being provided unnecessarily.

The light source unit 62 is connected to the input terminal of the optical fiber 61, and from the input terminal it emits detection light that enters the optical fiber 61. The light-receiving unit 63 is connected to the output terminal of the optical fiber 61 and is also connected to an input terminal of the signal processing unit 7. The light-receiving unit 63 receives the detection light emitted from the output terminal of the optical fiber 61, converts it into an electrical signal and then outputs. As is shown in FIG. 2A and FIG. 2B, the light source unit 62 and the light-receiving unit 63 are placed at the sides of the power-supplying coil 24 such that they do not intrude into the space between the power-supplying coil 24 and the power-receiving coil 31, namely, into the area where a strong magnetic field is generated between the power-supplying coil 24 and the power-receiving coil 31 when a wireless power supply operation is being conducted. If a heat source is present in the vicinity of the optical fiber 61, the refractive index of the optical fiber 61 changes in localized portions depending on the temperature of the heat source. As a consequence, the frequency components of the detection light emitted from the output terminal of the optical fiber 61 change, so that, as a result, the output signal from the light-receiving unit 63 also changes in the temperature detection unit 6. Accordingly, when a heat source is present in the vicinity of the optical fiber 61, the temperature detection unit 6 outputs as a detection result an electrical signal that includes information showing the position of the heat source.

The signal processing unit 7 is connected to the temperature detection unit 6 and, based on a detection result output from the temperature detection unit 6, detects the presence or non-presence of a conductive foreign matter within the magnetic field. The signal processing unit 7 analyzes output signals from the temperature detection unit 6, and if information showing the heat source is contained therein, provides notification of this fact. The notification may take the form, for example, of a display on a display monitor (not shown), or a warning sound issued by an alarm device (not shown). Note that it is also possible for the signal processing unit 7 to be formed as an integral unit together with the power supply control unit 25 of the power-supplying device 2.

Next, an operation of a wireless power supply system 1 which includes the foreign matter detection device 4 of the present embodiment having the above-described structure will be described.

The supply of power from the power-supplying device 2 to the power-receiving device 3 is started in the following manner. Namely, the vehicle M is parked in a predetermined position in the parking space S, and when the power-supplying coil 24 and the power-receiving coil 31 have been positioned facing each other, a control command instructing that the supply of power be started is input from the power supply control unit 25 to the power-supplying circuit 23. When the control command is input into the power-supplying circuit 23, power from the power source 21 that has been converted into DC power by the rectifier circuit 22 is converted into high-frequency power by the power-supplying circuit 23, and magnetic field oscillation is formed in the power supply-side resonance circuit. When the magnetic field oscillation is formed in the power supply-side resonance circuit, the power-reception side resonance circuit resonates, and high-frequency power is transmitted from the power supply-side resonance circuit to the power reception-side resonance circuit.

After the high-frequency power transmitted to the power reception-side resonance circuit has been converted into DC power by the power-receiving circuit 32 and has been rectified, it is supplied to the battery 34 via the charging circuit 33. The supplied power is then stored in the battery 34. As a result, charging of the battery 34 takes place.

A case will now be considered in which a conductive foreign matter intrudes between the power-supplying coil 24 and the power-receiving coil 31 while power is being supplied wirelessly in the manner described above. In such a case, because the conductive foreign matter intrudes into the magnetic field formed by the power-supplying coil 24 (namely, by the power-supplying device 2), an eddy current is generated in the conductive foreign matter as a result of the effects of the magnetic field, and it causes the conductive foreign matter to generate heat. When the conductive foreign matter generates heat in this manner, the refractive index of the optical fiber 61 changes in localized portions in the vicinity of the conductive foreign matter, and a detection result that include temperature information and position information about the heat source are output from the temperature detection unit 6. The detection result is input into the signal processing unit 7. The signal processing unit 7 then analyzes the detection result and, if information showing the heat source is contained therein, provides notification of this fact.

Next, the operation and effects of the foreign matter detection device 4 of the present embodiment that incorporates the above-described wireless power supply system 1 will be described.

According to the foreign matter detection device 4 of the present embodiment, there is provided the temperature detection unit 6 that detects the temperature in the magnetic field formed by the power-supplying coil 24. When a conductive foreign matter intrudes into the magnetic field, the conductive foreign matter generates heat due to the effects of the magnetic field. Thus a signal showing the intrusion of the conductive foreign matter is contained in the detection result from the temperature detection unit 6. In other words, according to the foreign matter detection device 4 of the present embodiment, a signal showing the presence or non-presence of a conductive foreign matter is acquired by the temperature detection unit 6. Accordingly, as a result of the detection result from the temperature detection unit 6 being analyzed by the signal processing unit 7, it is possible to detect the presence or non-presence of a conductive foreign matter. Accordingly, according to the foreign matter detection device 4 of the present embodiment, when there is an intrusion by a conductive foreign matter, it is possible to quickly detect any reduction in transmission efficiency that is caused by the conductive foreign matter.

Moreover, in the foreign matter detection device 4 of the present embodiment, the temperature detection unit 6 is formed from the optical fiber 61 that is laid in a magnetic field formed by the power-supplying coil 24, the light source unit 62 that outputs detection light into the optical fiber 61, and the light-receiving unit 63 that receives the detection light through the optical fiber 61. According to the temperature detection unit 6, it is possible to specify the temperature and position of a heat source simply by emitting detection light using the light source unit 62, and then receiving the detection light using the light-receiving unit 63. Accordingly, it is possible to specify the temperature and position of the heat source using a simple structure.

Moreover, in the foreign matter detection device 4 of the present embodiment, the optical fiber 61 is used as an optical waveguide in the temperature detection unit 6. The optical fiber 61 is formed from an electrically insulating material. According to the temperature detection unit 6 which uses the optical fiber 61, the optical fiber 61 is not affected by the magnetic field, and the transmission efficiency from the power-supplying coil 24 to the power-receiving coil 31 is not harmed by the temperature detection unit 6. Moreover, the shape of the optical fiber 61 can be easily changed. It can be easily laid so as to conform to the shape of the power-supplying coil 24, so that a foreign matter can be detected over the entire area of the power-supplying coil 24 without any overlap or any omission.

Moreover, because the light source unit 62 and the light-receiving unit 63 are located away from the space between the power-supplying coil 24 and the power-receiving coil 31, that is, in areas where only a weak magnetic field is generated during the wireless supply of power, the magnetic field is prevented from being affected by the light source unit 62 and the light-receiving unit 63 and any reduction in the efficiency of the wireless power supply is also prevented. Furthermore, even if the light source unit 62 and the light-receiving unit 63 contain an electrically conductive material such as metal or the like, any heat generation that is caused by the action of the magnetic field during the wireless power supply is prevented.

Moreover, the foreign matter detection device 4 of the present embodiment is provided with the glass sheet 5 that is formed from glass fibers (i.e., an insulating material) that supports the optical fiber 61. Because the glass sheet 5 is formed from an electrically insulating material in the form of glass fibers, even if it is placed within the magnetic field formed by the power-supplying coil 24, it does not generate any heat and does not cause any reduction in the transmission efficiency. According to the foreign matter detection device 4 of the present embodiment, it is possible to support the optical fiber 61 without causing any deterioration in the transmission efficiency. Moreover, because the glass sheet 5 is formed from glass fibers, it is mechanically extremely strong. Therefore, for example, even if the vehicle or the like comes into contact with the glass sheet 5, it is possible to prevent a heavy load being applied to the optical fiber 61.

Second Embodiment

Next, a second embodiment of the present invention will be described. Note that in the description of the second embodiment, any description of portions thereof that are the same as in the above-described first embodiment is either omitted or simplified.

Figure 3A:
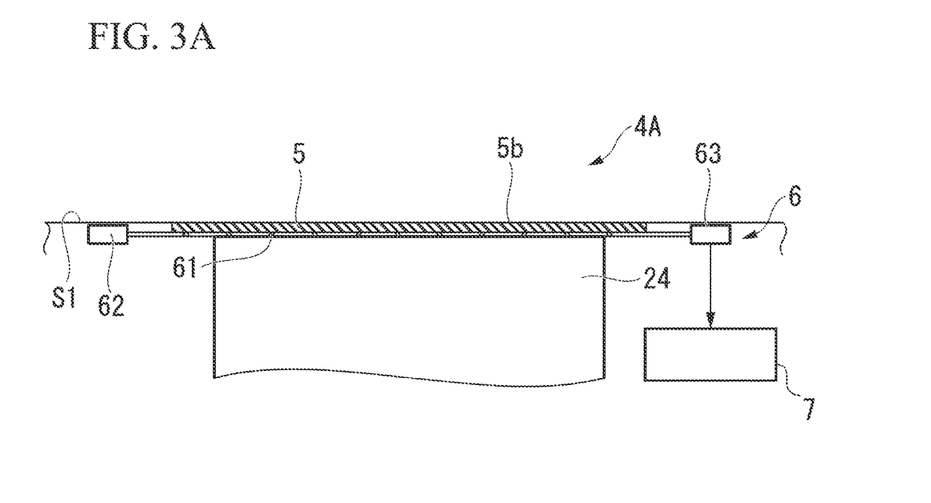
FIG. 3A is an enlarged side view that includes a foreign matter detection device according to a second embodiment of the present invention.
Figure 3B:
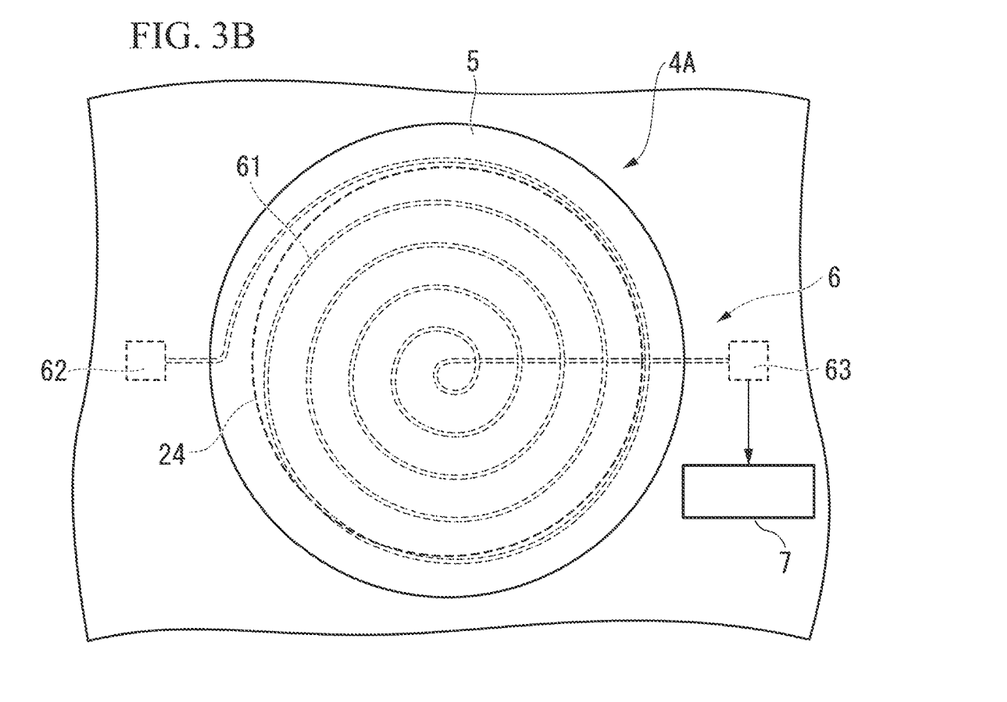
FIG. 3B is an enlarged top view that includes the foreign matter detection device according to the second embodiment of the present invention.

FIGS. 3A and 3B are enlarged views that include a foreign matter detection device 4A of the present embodiment. FIG. 3A is a side view, while FIG. 3B is a top view. As is shown in these drawings, because the light source unit 62 and the light-receiving unit 63 are embedded into the foreign matter detection device 4A of the present embodiment, they are positioned below the vehicle-supporting surface S1. Moreover, the top surface 5b of the glass sheet 5 is flush with the vehicle-supporting surface S1.

According to the foreign matter detection device 4A of the present embodiment in which the above-described structure is employed, it is possible for the foreign matter detection device 4A to be installed without any portion thereof protruding above the vehicle-supporting surface S1. Thus the foreign matter detection device 4A is prevented from coming into contact with the vehicle M.

Third Embodiment

Next, a third embodiment of the present invention will be described. Note that in the description of the third embodiment as well, any description of portions thereof that are the same as in the above-described first embodiment is either omitted or simplified.

Figure 4A:
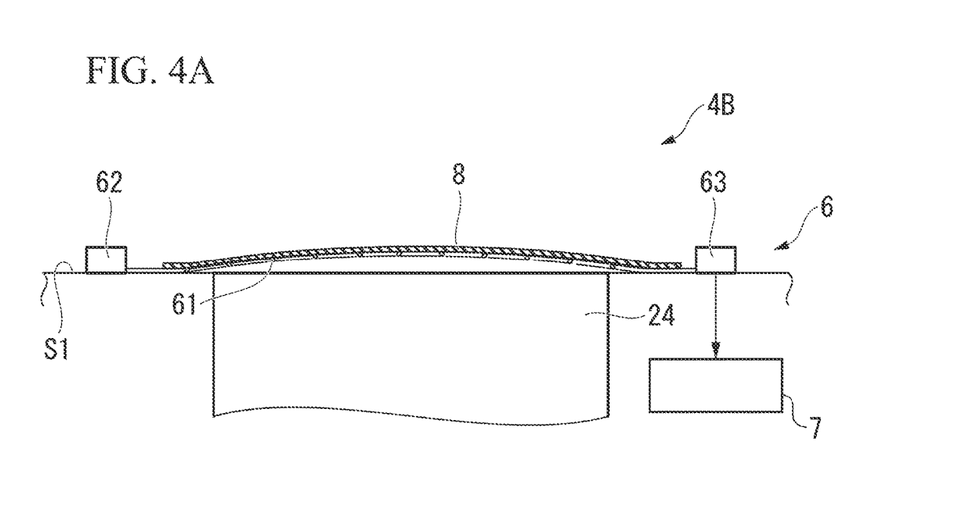
FIG. 4A is an enlarged side view that includes a foreign matter detection device according to a third embodiment of the present invention.
Figure 4B:
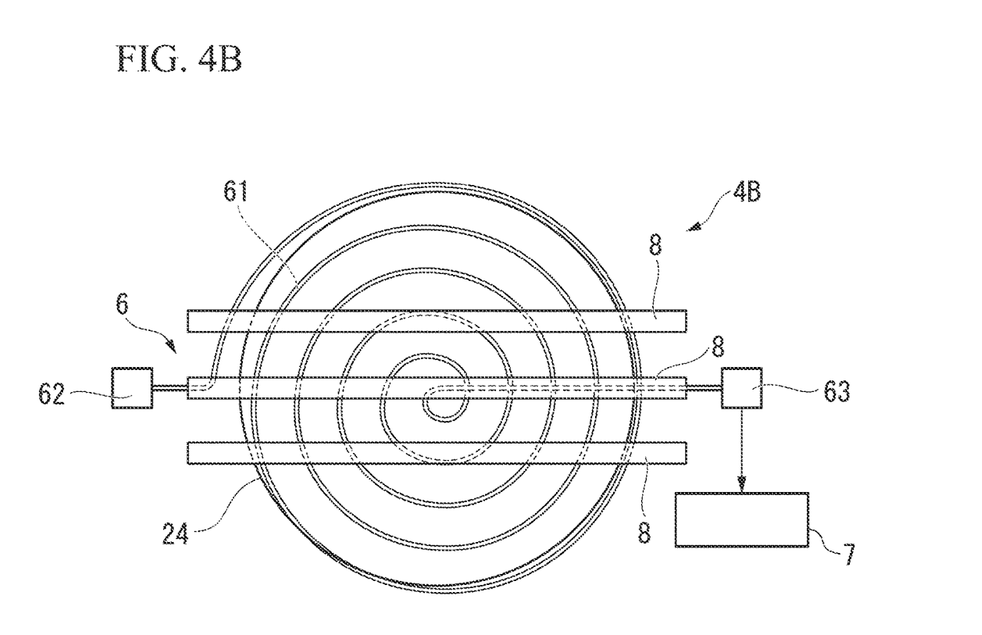
FIG. 4B is an enlarged top view that includes the foreign matter detection device according to the third embodiment of the present invention

FIGS. 4A and 4B are enlarged views that include a foreign matter detection device 4B of the present embodiment. FIG. 4A is a side view, while FIG. 4B is a top view. As is shown in these drawings, the foreign matter detection device 4B of the present embodiment is provided with three flexible wire components 8 (i.e., supporting portions) instead of the glass sheet 5 of the above-described first embodiment.

These wire components 8 are adhered to by the optical fiber 61, and support the optical fiber 61. The wire components 8 are formed from an electrically insulating material as the glass sheet 5, and are also sufficiently heat resistant for them to not be damaged by a heat-generating conductive foreign matter. These wire components 8 can be formed, for example, from heat-resistant rubber.

According to the foreign matter detection device 4B of the present embodiment which has the above-described structure, even if the vehicle M comes into contact with the wire components 8, the wire components 8 flexibly deform, and the vehicle M can be prevented from being damaged. Furthermore, because the wire components 8 are flexible, after they have been deformed, they return to their original shape when the vehicle M moves away. Thus the position of the optical fiber 61 can be returned to its original location.

Note that, in the foregoing description, there are three wire components 8, however, provided that they are able to support the optical fiber 61, and are able to return to their original shape after having been pressed by the vehicle M, then the number of wire components 8 can be set to an optional number.

Fourth Embodiment

Next, a fourth embodiment of the present invention will be described. Note that in the description of the fourth embodiment, any description of portions thereof that are the same as in the above-described first embodiment is either omitted or simplified.

Figure 5A:
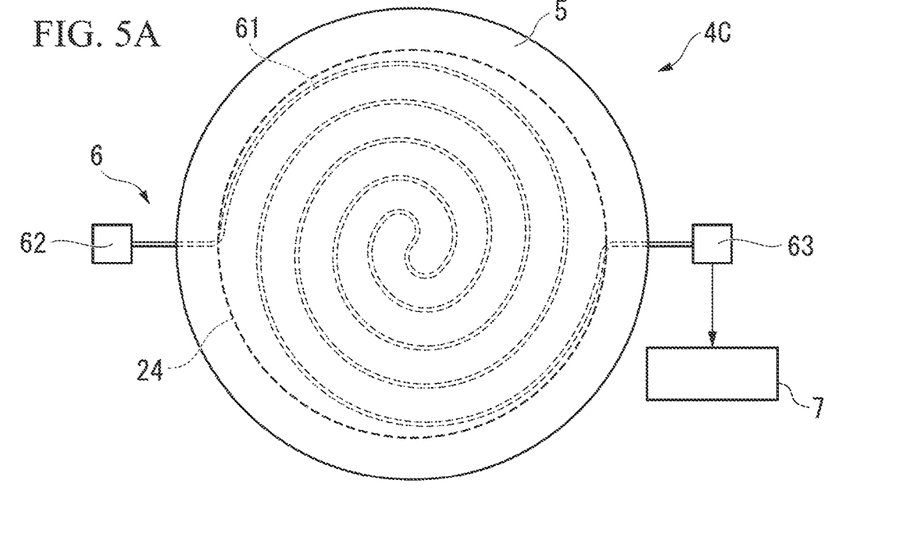
FIG. 5A is an enlarged top view that includes a foreign matter detection device according to a fourth embodiment of the present invention.

FIG. 5A is an enlarged top view that includes a foreign matter detection device 4C of the present embodiment. As is shown in the drawing, in the foreign matter detection device 4C of the present embodiment, the optical fiber 61 is laid out such that, when viewed from above, the optical fiber 61 has no overlapping portions.

If the optical fiber 61 is laid out such that it overlaps itself partway along its length, then when, for example, the vehicle M is driven onto the glass sheet 5 such that a heavy load is applied from above to the optical fiber 61, then an even heavier load is applied locally to the overlapping portions, and there is a possibility that the performance of the optical fiber 61 will be reduced. In contrast, according to the foreign matter detection device 4 of the present embodiment, because the optical fiber 61 is laid out such that, when viewed from above, the optical fiber 61 has no overlapping portions, it is possible to prevent a heavy load from being applied to localized portions of the optical fiber 61.

Fifth Embodiment

Next, a fifth embodiment of the present invention will be described. Note that in the description of the fifth embodiment, any description of portions thereof that are the same as in the above-described first embodiment is either omitted or simplified.

Figure 5B:
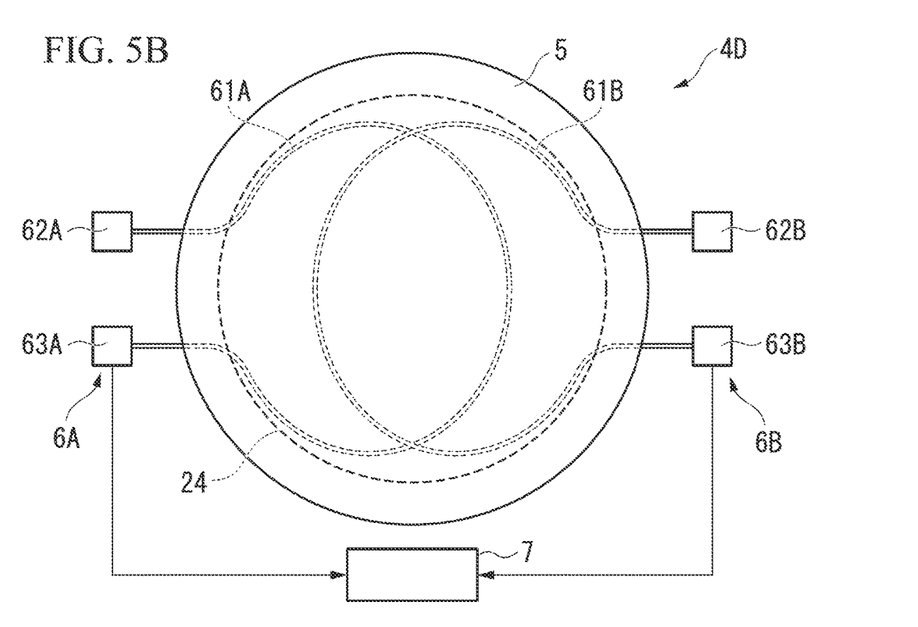
FIG. 5B is an enlarged top view that includes a foreign matter detection device according to a fifth embodiment of the present invention.

FIG. 5B is an enlarged top view that includes a foreign matter detection device 4D of the present embodiment. As is shown in the drawing, two temperature detecting units, namely, a temperature detecting unit 6A and a temperature detecting unit 6B are provided in the foreign matter detection device 4D of the present embodiment.

As is shown in FIG. 5B, the optical fiber 61A of the temperature detection unit 6A and the optical fiber 61B of the temperature detection unit 6B are wound in a single wind. Moreover, the optical fiber 61A of the temperature detection unit 6A and the optical fiber 61B of the temperature detection unit 6B are placed such that, when viewed from above, their winding centers are mutually offset. Furthermore, in the foreign matter detection device 4D of the present embodiment, the light source unit 62A and the light-receiving unit 63A of the temperature detection unit 6A are located on one side of the power-supplying coil 24 (i.e., on the left side in FIG. 5B) when viewed from above, while the light source unit 62B and the light-receiving unit 63B of the temperature detection unit 6B are located on the opposite side (i.e., on the right side in FIG. 5B) of the power-supplying coil 24.

The foreign matter detection device 4D of the present embodiment is provided with a plurality of temperature detection units (i.e., the temperature detection unit 6A and the temperature detection unit 6B). Namely, in the foreign matter detection device 4D, a plurality of optical fibers (i.e., the optical fiber 61A and the optical fiber 61B) are laid down. Thus it is no longer necessary to cover the entire area of the power-supplying coil 24 with only a single optical fiber, and it is possible to reduce the number of winds in one optical fiber. As a result, the load on the optical fiber can be reduced.

Moreover, in the foreign matter detection device 4D of the present embodiment, when viewed from above, the light source unit 62A and the light-receiving unit 63B of the one temperature detection unit 6A are placed on one side of the power-supplying coil 24, and the light source unit 62B and the light-receiving unit 63B of the other temperature detection unit 6B are placed on the opposite side of the power-supplying coil 24. In a case, for example, of damage occurring as a result of water entry or as a result of being struck by the vehicle, the locations affected by the damage do not extend over the entire periphery of the power-supplying coil 24, and it may generally be assumed that the damage will be limited to only one side of the power-supplying coil 24. Thus by placing the light source unit 62A, the light-receiving unit 63A, the light source unit 62B, and the light-receiving unit 63B in the above-described manner, it is possible to reduce the possibility of the light source units and light-receiving units of both temperature detection units being damaged at the same time. Accordingly, the foreign matter detection device 4D of the present embodiment that employs the structure explained above has superior reliability.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the claims.

For example, in the above-described embodiments, a structure is described in which the optical fiber 61, the optical fiber 61A, and the optical fiber 61B (hereinafter, these will be abbreviated to 'optical fibers 61 and the like') are used as an optical waveguide. However, the present invention is not limited to this structure and it is also possible to use a plate-shaped or sheet-shaped optical waveguide.

Moreover, the supporting portion of the present invention may be formed from sheet-shaped rubber, and a structure may be employed in which the optical fibers 61 and the like are wound around the interior of the supporting portion. In this case, because the supporting portion and the optical fibers 61 and the like are integrated into a single unit, the handleability thereof is improved.

Moreover, in the above-described embodiments, a structure is described in which the optical fibers 61 and the like are wound out. However, the present invention is not limited to this structure and it is also possible for the optical fibers 61 and the like to meander. It is also possible for a plurality of rectilinear optical fibers to be laid out in parallel with each other or in a lattice configuration.

Moreover, in the above-described embodiments, a structure is described in which the optical fibers 61 and the like adhere to the bottom surface of the supporting portion (i.e., the glass sheet 5 and the wire components 8). However, the present invention is not limited to this structure and it is also possible for the optical fibers 61 and the like to adhere to the top surface of the supporting portion. Moreover, it is also possible to eliminate the supporting portion and the optical fibers 61 and the like adhere directly to the top surface of the power-supplying coil 24.

However, in such a case, because the optical fibers 61 and the like are exposed, it is desirable to implement measures to prevent the vehicle M from coming into contact with the optical fibers 61 and the like.

Moreover, in the above-described embodiments, a structure is described in which the optical fibers 61 and the like are wound within a horizontal plane. However, the present invention is not limited to this structure and it is also possible, for example, for the supporting portion (i.e., the glass sheet 5) to be laid on an incline and for the optical fibers 61 and the like to be wound within the inclined plane. In such a case, because there is a high likelihood that a foreign matter will remain in lower portions of the inclined supporting portion, by placing the optical fibers 61 and the like close to each other in the lower portions of the supporting portion, it is possible to more precisely and reliably ascertain the position of the foreign matter.

Moreover, in the above-described embodiments, a structure is described in which the power-supplying coil 24 is wound in a substantially circular configuration, and the optical fibers 61 and the like are also wound in a substantially circular configuration in the same way. However, the present invention is not limited to this structure and if the power-supplying coil 24 is wound in a substantially square configuration, then it is desirable for the optical fibers 61 and the like to also be wound in a substantially square configuration in the same way.

Moreover, in the above-described embodiments, a structure is described in which the temperature within the magnetic field is detected using the optical fibers 61 and the like which are serving as an optical waveguide. However, the present invention is not limited to this structure and, for example, it is also possible to detect the temperature using an infrared camera that acquires an image of the area above the power-supplying coil 24.

Moreover, in the above-described embodiments, it is also possible to provide an additional structure that raises and lowers the optical fibers 61 and the like. It becomes possible to lower the optical fibers and the like when the vehicle M is being moved, and to thereby prevent the optical fibers 61 and the like from coming into contact with the vehicle M.

Moreover, in the above-described embodiments, a structure is described in which the vehicle-supporting surface S1 is the ground surface. However, it is not necessary for the vehicle-supporting surface S1 to be the ground surface, and in an automated parking place and the like the top surface of the pallet forms the vehicle-supporting surface.

Moreover, in the above-described embodiment, a magnetic field resonance method is employed for the method of supplying power wirelessly, however, it is also possible to use another wireless power supply method such as an electromagnetic induction method and the like.

Moreover, the power-supplying coil 24 and the power-receiving coil 31 are not limited to helical coils. Provided that they enable power to be supplied wirelessly between the power-supplying coil 24 and the power-receiving coil 31, then an arbitrary type and shape of coil such as a solenoid coil may be used, and the type, shape, and size of the both coils may be different.

INDUSTRIAL APPLICABILITY

The foreign matter detection device of the present invention makes it possible to rapidly detect any reduction in the transmission efficiency of a wireless power supply system that is caused by a conductive foreign matter.

The invention claimed is:

1. A foreign matter detection device comprising:
a temperature detection means that is provided between a power-supplying device and a power-receiving device and detects a temperature distribution in a magnetic field formed by the power-supplying device transmitting power wirelessly to the power-receiving device; and
a signal processor that, based on a detection result from the temperature detection means, detects a conductive foreign matter in the magnetic field, wherein
the power-supplying device is provided with a power-supplying coil; and
a supporting portion is located above the power-supplying coil, and
the temperature detection means is provided so that the temperature detection means is large enough to cover the entirety of an upper surface of the power-supplying coil from above,
wherein the temperature detection means is provided with:
an optical waveguide laid in the magnetic field, a part of the optical waveguide being wound in the same shape as the power-supplying coil;
a light source unit that outputs detection light into the optical waveguide; and
a light-receiving unit that receives the detection light through the optical waveguide,
wherein
the optical waveguide is an optical fiber;
the power-supplying coil is provided in a parking space for a vehicle;
the supporting portion is formed from an insulating material which supports the optical fiber and comprises at least one flexible wire components; and
each of the at least one flexible wire components deform and return to their original shape after they have been deformed.

2. The foreign matter detection device according to claim 1, wherein the optical fiber is laid such that, when viewed from above, the optical fiber has no overlapping portions.

3. The foreign matter detection device according to claim 2, wherein a plurality of the optical fibers are laid.

4. The foreign matter detection device according to claim 1, wherein a plurality of the optical fibers are laid.

* * * * *